Sept. 25, 1945.   I. KING ET AL   2,385,579
FROZEN CONFECTION DISPENSER
Filed Aug. 14, 1944
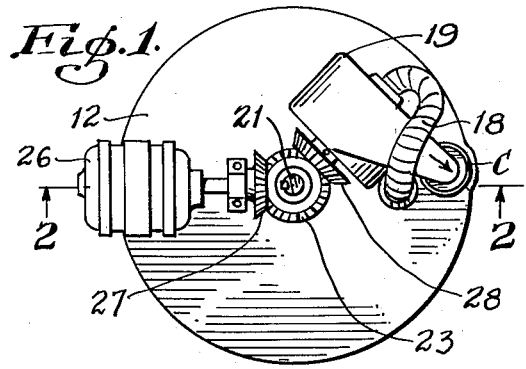
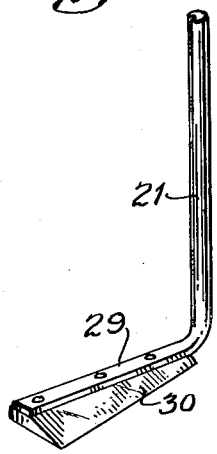
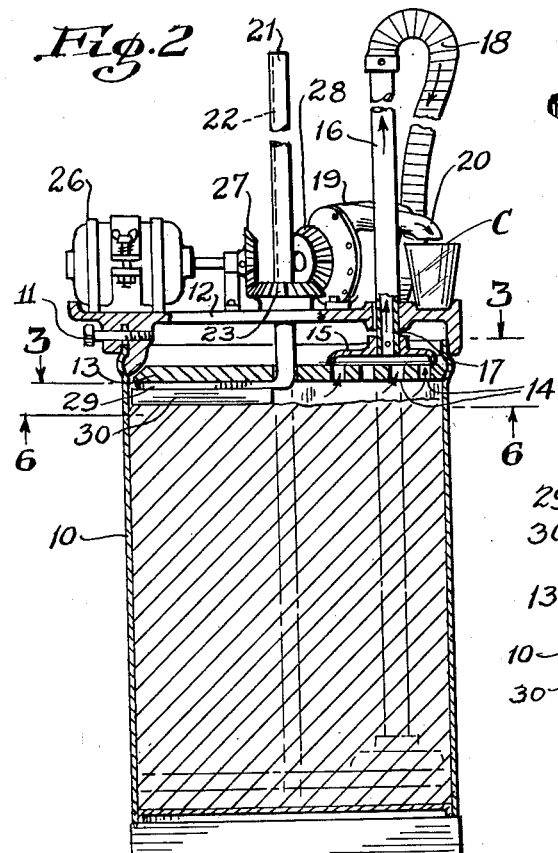
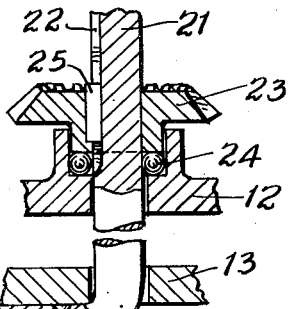
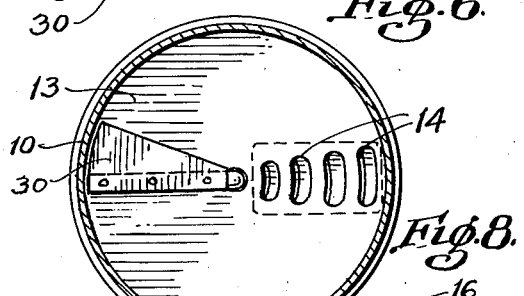
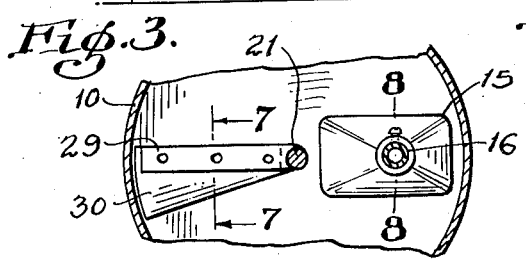
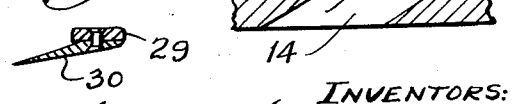
INVENTORS:
IRVING KING AND
BERTHA R. BURG.
By Martin P. Smith
ATTORNEY.

Patented Sept. 25, 1945

2,385,579

UNITED STATES PATENT OFFICE 2,385,579

FROZEN CONFECTION DISPENSER

Irving King and Bertha R. Burg, Los Angeles, Calif.

Application August 14, 1944, Serial No. 549,464

2 Claims. (Cl. 222—227)

Our invention relates to an ice cream dispenser and has for its principal object, to provide a simple, practical, inexpensive and sanitary device adapted to be removably positioned upon the large cans filled with ice cream or like frozen confections, from which small portions of the products are removed and dispensed to fill individual orders.

Heretofore, the general practice of filling individual orders of ice cream and the like, is to remove the cover of the can or container and then remove therefrom with a spoon or scoop the desired amount of the frozen product, such procedure tending to produce rapid melting and softening of the exposed portion of the product, besides being unsanitary to a considerable extent, due to the constant re-use of a scoop or dipper generally stored on an exposed shelf or counter, while not in use, and the repeated movements of the hand and arm into the can while removing the dispensed portions therefrom.

Our invention contemplates a dispensing apparatus including a practically airtight cover removably positioned on the large can or container, with a scraper mounted for operation on the underside of said cover and with means on top of the cover for actuating said scraper to cut away the upper portion of the body of ice cream in the can and deliver same into a service glass or other receptacle supported on said cover, thus providing a dispensing service which is rapid, highly effective and entirely sanitary.

With the foregoing and other objects in view, our invention consists in certain novel features of construction and arrangement of parts which will be hereinafter more fully described and claimed and illustrated in the accompanying drawing, in which:

Fig. 1 is a top plan view of the dispenser.

Fig. 2 is a vertical cross section taken on the line 2—2 of Fig. 1.

Fig. 3 is a fragmentary section taken on the line 3—3 of Fig. 2.

Fig. 4 is a perspective view of the confection scraper and its shaft.

Fig. 5 is an enlarged detail section of a bearing in the cover plate.

Fig. 6 is a horizontal section taken on the line 6—6 of Fig. 2.

Fig. 7 is an enlarged section taken on the line 7—7 of Fig. 3.

Fig. 8 is an enlarged cross section taken on the line 8—8 of Fig. 3.

Referring by numerals to the accompanying drawing which illustrate a preferred embodiment of our invention, 10 designates a can adapted to contain several gallons of ice cream or other frozen confection and removably positioned on the top thereof and held by a screw 11 or the like, is a cover plate 12.

Arranged to slide freely within can 10 below cover plate 12 is a plate 13 and formed therein to one side of the center thereof is a row of short concentric slots 14 having inclined ends as seen in Fig. 8.

Secured on top of cover 11 over the slots 14 is a shallow housing 15, and secured to the top thereof is the lower end of a tube 15 which has a sliding fit through an opening 17 in cover 11.

The upper end of tube 16 is connected by a flexible tube 18 to the intake side of a suction pump 19, having a discharge spout 20 for delivering the confection into a suitable receptacle, for instance, a glass cup C positioned on top of cover plate 12.

Mounted for rotation in the centers of plates 12 and 13 is a vertical shaft 21 having a longitudinal key way 22, and mounted for relative sliding movement on said shaft is a bevelled pinion 23 which engages an antifriction bearing 24 on plate 12 and said pinion having a key 25 which engages in key way 22.

This shaft 21 may be rotated manually or as shown, by a small slow speed electric motor 26 mounted on plate 12, the shaft of which motor carries a bevelled pinion 27, which engages pinion 23 and a bevelled pinion 28 on the shaft of pump 19 also engages pinion 23.

A horizontal arm 29 projects laterally from the lower end of shaft 21 beneath plate 13 and secured to the underside of said arm is a combined cutting and scraping blade 30, which is slightly inclined crosswise as seen in Fig. 7.

When cover plate 12 is secured on top of a can, the latter and its contents are practically sealed against the atmosphere, dust and the like, and to dispense a small portion of the contents of the can, motor 26 is operated and due to the conjoined pinions 27, 23 and 28, shaft 21 and pump 19 will be operated.

Scraper 30 carried by arm 29 will plow through the upper portion of the body of frozen confection, thereby loosening a thin layer which is carried around beneath plate 13 until the apertures 14 are reached, whereupon the suction of the pump draws the cut portion of the confection upward through said apertures, through tube 15 and flexible tube 18 and from spout 20, said confection is delivered into the cup C or other receptacle.

As the ice cream is thus cut away and dispensed, the plate 13, acting as a follower, moves downward with the lowering level of the body of the confection, with shaft 21 and tube 16 sliding through cover plate 12.

Thus it will be seen that we have provided a frozen confection dispensing device which is simple in structure, inexpensive of manufacture and very effective in performing the functions for which it is intended.

It will be understood that minor changes in the size, form and construction of the various parts of our improved dispenser may be made and substituted for those shown and described herein without departing from the spirit of the invention, the scope of which is set forth in the appended claims.

We claim as our invention:

1. In an ice cream dispenser, a cover plate adapted to be positioned on a container, a plate disposed below said cover plate, a shaft mounted to rotate in both plates and to slide through said cover plate, a scraper carried by said shaft below said second mentioned plate, there being openings formed in said second mentioned plate, a hood over said openings, a duct leading from said hood upwardly through said cover plate, a pump mounted on said cover plate to which pump said duct is connected and means for simultaneously driving said shaft and pump.

2. An ice cream dispenser as set forth in claim 1 and which shaft and pump driving means is carried by said cover plate.

IRVING KING.
BERTHA R. BURG.